No. 814,604. PATENTED MAR. 6, 1906.
R. & W. J. HILLIS.
GAS PRESSURE REGULATOR AND GOVERNOR.
APPLICATION FILED MAY 4, 1905.
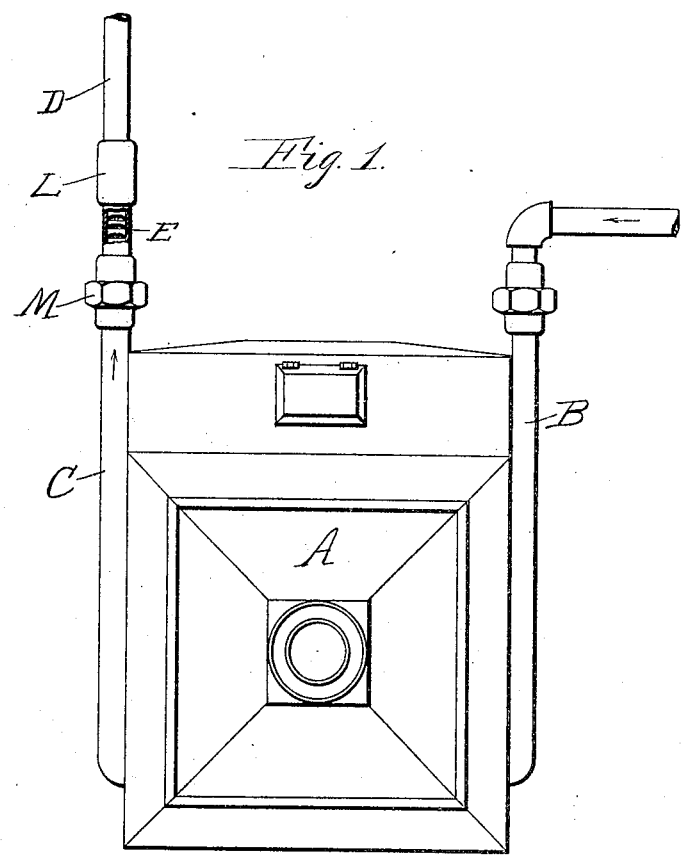
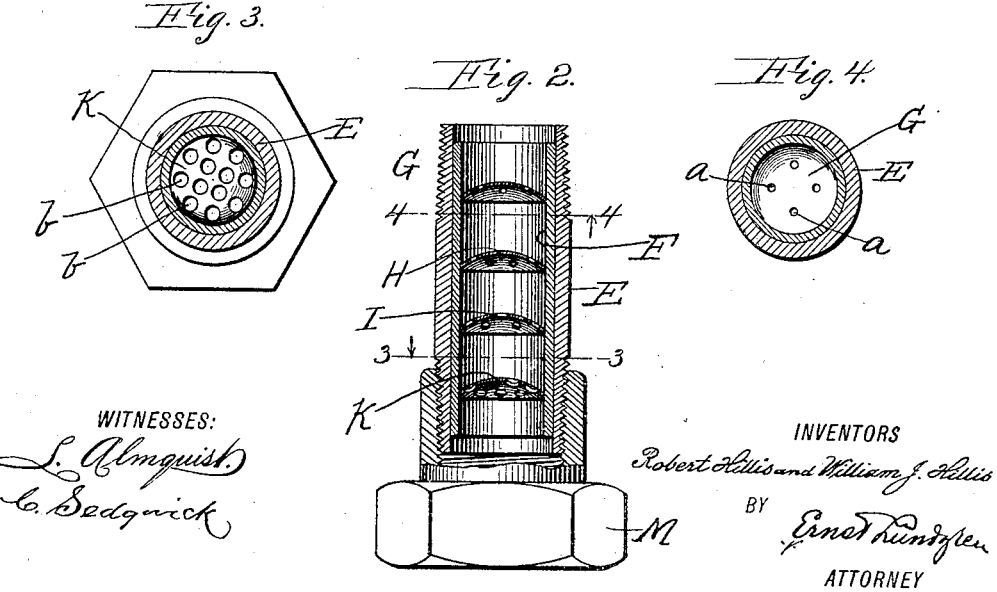
WITNESSES:
L. Almquist
C. Sedgwick
INVENTORS
Robert Hillis and William J. Hillis
BY Ernst Lundgren
ATTORNEY

UNITED STATES PATENT OFFICE.

ROBERT HILLIS, OF EAST ORANGE, NEW JERSEY, AND WILLIAM JAMES HILLIS, OF NEW YORK, N. Y.

GAS-PRESSURE REGULATOR AND GOVERNOR.

No. 814,604.  Specification of Letters Patent.  Patented March 6, 1906.

Application filed May 4, 1905. Serial No. 258,753.

*To all whom it may concern:*

Be it known that we, ROBERT HILLIS, residing at East Orange, in the county of Essex and State of New Jersey, and WILLIAM JAMES HILLIS, residing in the borough of Brooklyn, city of New York, in the county of Kings and State of New York, citizens of the United States, have invented certain new and useful Improvements in Gas-Pressure Regulators and Governors, of which the following, taken in connection with the accompanying drawings, is a full, clear, and exact specification.

This invention relates to devices employed for regulating the pressure and governing the flow of gas from a gas-meter.

The object of our invention is to provide or produce a simple, cheap, reliable, durable, and efficient gas-pressure regulator and governor, which may be easily and quickly applied in connection with the gas service-pipe and with the outlet from the meter and which will operate to effectually regulate the pressure of the gas in the service-pipe and govern or control the flow of gas when at the desired pressure.

To accomplish all of the foregoing and to secure other and further advantages in the matters of construction, operation, application, and use, our improvements involve a new and useful device of which the parts are peculiarly constructed and arranged, as will be herein first fully described and then pointed out in the claim.

In the accompanying drawings, forming part of this specification, Figure 1 is a front elevation showing an ordinary form of gas-meter with our improved pressure-regulator and governor connected with the outlet-pipe and with the service-pipe leading from the meter, a portion of the applied device being shown in section. Fig. 2 is a vertical view, partly in section and partly in elevation, on a scale enlarged beyond that of Fig. 1 and showing the construction and arrangement of the regulator and governor and the couplings or unions connected therewith. Fig. 3 is a horizontal section and plan view on a plane through line 3 3 of Fig. 2 and looking in the direction of the contiguous arrow. Fig. 4 is a horizontal section and plan view on a plane through line 4 4 of Fig. 2 and looking in the direction of the contiguous arrow.

In all the figures like letters of reference wherever they occur indicate corresponding parts.

A represents any ordinary form of gas-meter, of which B is the inlet-pipe, and C the outlet-pipe.

D is the gas service-pipe intended to be extended, as may be desired, and to convey the gas to the point or points of consumption after it has passed through the meter.

We find it most advantageous to apply our improved regulator and governor near the meter; but of course it might be applied at any other desired point in the service-pipe between the meter and the first burner or first branch; but the nearer it is to the meter the better it will regulate the pressure and govern the flow of the gas.

E is a short section of gas pipe or tubing, the same being threaded at both ends and of about the same diameter as the service-pipe to be employed. Fitted within this section E and capable of easy removal therefrom is an interior tubing F, of metal or other suitable substance which is not affected by the gas. Arranged in the tube F in a permanent or semipermanent manner are a number of disks of metal or other suitable material, and these disks are preferably four in number, although there might be more and in some cases less than four. The disks are represented at G, H, I, and K, and they are concaved on one side and provided with perforations for the passage of gas through them, being separated by about equal distances within the tube F. The perforations through the disks vary in size and number, according to the circumstances of each particular case, the disk having the largest number and the largest size of perforations being located nearest the meter, the disk with the next largest number and largest size of perforations being next beyond the first one, and so on to the end of the series. Thus it will be seen that the disks are graduated from the first to the last of the series. The disks are of equal diameter, and they are forced into the interior cylinder from either end thereof and are held in place by frictional contact with the inner smooth surface of said cylinder, the inner and outer cylinders being both imperforate. The concaved form of the disks insures a sufficiently-tight fit within the interior cylinder, and being uniformly circular and of equal diameter they are all made with one tool and require no other special fitting or formation.

In the particular example selected for illustration it may be assumed that there are four burners to be served through the service-pipe. In such case we preferably make the final disk in the series with four small perforations, as at *a a*, of size so that the requisite amount of gas under the required pressure will pass through the four orifices. The next disk H may have six perforations, preferably a trifle larger than those in the disk G. The disk I may have eight perforations, preferably a trifle larger than those in the disk H, and the disk K may have twelve perforations, as at *b b*, preferably larger than those in the disk I. We do not, however, desire to be understood as being confined to these particular numbers or to the particular sizes indicated, for obviously the number and sizes of perforations might be varied and similar results secured. For instance, for a two-burner service the last disk in the series may well be provided with but two perforations, and the last disk may have three or more perforations according to the number of burners to be served; but with the device arranged to operate in accordance with our invention it will be understood that when the gas is flowing through the regulator and governor it will first be impeded somewhat by the first disk. Having passed the first disk, it will be again further impeded by the second. Having passed the second, it will be again further impeded by the third, and similarly for the fourth, and when it passes through the latter it will be only capable of flowing at the desired rate for which the last disk was constructed. The series of disks with perforations of varying numbers and varying sizes operates to break up the otherwise free flow of the gas through the section E, and thus not only to regulate the pressure in the service-pipe and keep it practically uniform, but to govern the amount of pressure of the issuing gas, and therefore the amount of flow from the meter into the service-pipe.

The advantages of the improved combined regulator and governor, so far as its use is concerned, are to afford a steady flow of gas to the burners and to maintain the pressure at the burners at the required degree, whereby there is insured not only a steady illumination, but an economical consumption of gas. The pressure of gas on the mains or inlet-pipe to the meter may be increased to a considerable extent; but with the improved device in place this increase of pressure will not materially increase the amount of gas which will pass through the meter.

We preferably employ an ordinary pipe-union at one end of the section E, as at L, and a coupling-union at the other end, as at M, by which to properly locate and secure the improved device in position for use.

The inner tube or sleeve F may be easily withdrawn and replaced by another with the proper number and arrangements of disks whenever so desired.

Being constructed and arranged substantially in accordance with the foregoing explanations, our improved device will be found to answer all the purposes or objects of the invention hereinbefore alluded to.

Having now fully described our invention, what we claim as new herein, and desire to secure by Letters Patent, is—

The herein-described gas regulator and governor, the same being composed of an outer imperforate cylindrical tube-section having threaded ends, an inner removable imperforate cylindrical tube-section, a series of perforated and concaved disks of equal diameters located in the inner tube-section and frictionally held in place therein, the perforations in the disks varying both in size and in number from the beginning to the end of the series, and threaded unions for removably coupling the device with a meter and with a gas service-pipe, substantially as shown and described.

In testimony whereof we have signed our names to this specification in the presence of two subscribing witnesses.

ROBERT HILLIS.
WILLIAM JAMES HILLIS.

Witnesses:
C. SEDGWICK,
J. M. HOWARD.